US007151643B2

United States Patent
Tsuda

(10) Patent No.: US 7,151,643 B2
(45) Date of Patent: Dec. 19, 2006

(54) APPARATUS AND METHOD FOR PROTECTING A DISK DRIVE IN A HARDCOPY DEVICE

(75) Inventor: Kenichi Tsuda, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 62 days.

(21) Appl. No.: 11/111,918

(22) Filed: Apr. 22, 2005

(65) Prior Publication Data

US 2006/0238829 A1  Oct. 26, 2006

(51) Int. Cl.
G11B 21/02 (2006.01)

(52) U.S. Cl. .................................................. 360/75

(58) Field of Classification Search ............ 360/75, 360/77.02, 69, 78.01; 370/352; 382/100; 358/1.15; 340/572.3; 235/383; 400/582; 705/21; 702/16, 97; 710/52; 714/16
See application file for complete search history.

(56) References Cited

U.S. PATENT DOCUMENTS 5,685,655 A * 11/1997 Del Signore et al. ....... 400/582
6,145,095 A * 11/2000 Tattari ........................ 714/16
6,311,237 B1 * 10/2001 Suzuki et al. ............... 710/52
6,351,717 B1 * 2/2002 Lambrecht .................. 702/97
6,366,904 B1 * 4/2002 BenHadda et al. .......... 707/3
6,779,722 B1 * 8/2004 Mason ........................ 235/383
6,788,205 B1 * 9/2004 Mason et al. ............ 340/572.3
6,794,586 B1 * 9/2004 Mason ..................... 177/25.15
6,839,632 B1 * 1/2005 Grace .......................... 702/16
2005/0018242 A1 * 1/2005 Azami ....................... 358/1.15
2005/0117773 A1 * 6/2005 Kobayashi .................. 382/100
2005/0187826 A1 * 8/2005 Wike et al. .................. 705/21
2005/0243804 A1 * 11/2005 Watai ......................... 370/352

FOREIGN PATENT DOCUMENTS

| JP | 11-216929 A   | 8/1999 |
| JP | 2002-052786 A | 2/2002 |
| JP | 2002-062763 A | 2/2002 |

* cited by examiner

Primary Examiner—Fred F. Tzeng
(74) Attorney, Agent, or Firm—Foley & Lardner LLP

(57) ABSTRACT

An apparatus and method for protecting a hard disk drive in a hardcopy device includes detecting an abnormal condition during operation of the hardcopy device, and moving a head of the hard disk drive to a safe position in response to the detection of the abnormal condition. An indication of the abnormal condition is generated after the head of the hard disk drive has been moved to the safe position.

18 Claims, 3 Drawing Sheets

APPARATUS AND METHOD FOR PROTECTING A DISK DRIVE IN A HARDCOPY DEVICE

FIELD OF THE INVENTION

The present invention relates generally to hardcopy devices and, more particularly, to a system and method for protecting a disk drive in a hardcopy device.

BACKGROUND OF THE INVENTION

Hardcopy devices, such as a printer, a fax machine, a plotter or a multi-function peripheral (MFP), have a hard disk drive (HDD) head that is located above a magnetic disk during user operation. When an abnormal condition arises during operation of the hardcopy device, such as due to a paper jam, a serviceman call, an empty toner, a full toner bag, or an empty paper condition, the device may be subjected to vibrations or other shock as a result of a user's efforts to resolve the abnormal condition. Any vibration or shock applied to the body of the device may be translated to the HDD that is mounted in the body, causing the HDD head to strike the magnetic disk. The striking of the magnetic disk by the head can cause damage to both the magnetic disk and the head.

In one conventional system, to protect the HDD from vibration or shock resulting from the recovering from the abnormal condition, a structural material is used to reduce any vibrations or shocks. In particular, a rubber or gel damper is placed between the HDD and a mounting sheet metal that fixes the HDD to a hard copy device. This system, however, may be unable to effectively reduce the vibration, as the reduction depends on the frequency of the given vibration or shock and the damping property of the rubber or gel. It also may be unable to show sufficient reduction depending on the size of the given vibration or shock. Although it is possible to use a damper that covers a wider frequency that is more effective for handling serious vibrations or shocks, such a damper is very expensive. In addition, since the quality of the damper material is soft, it can have a negative influence on recording and reproduction due to a self-excited vibration of a motor rotating inside the HDD.

It would be desirable to have a more effective and less costly system for protecting the HDD when an abnormal condition is being resolved.

SUMMARY OF THE INVENTION

According to an aspect of the invention, an image forming apparatus and method for protecting a hard disk drive in a hardcopy device includes detecting an abnormal condition during operation of the hardcopy device, and moving a head of the hard disk drive to a safety area in response to the detection of the abnormal condition. An indication of the abnormal condition is generated after the head of the hard disk drive has been moved to the safety area.

Further features, aspects and advantages of the present invention will become apparent from the detailed description of preferred embodiments that follows, when considered together with the accompanying figures of drawing.

DETAILED DESCRIPTION OF PREFERRED EMBODIMENT

Figure 1:
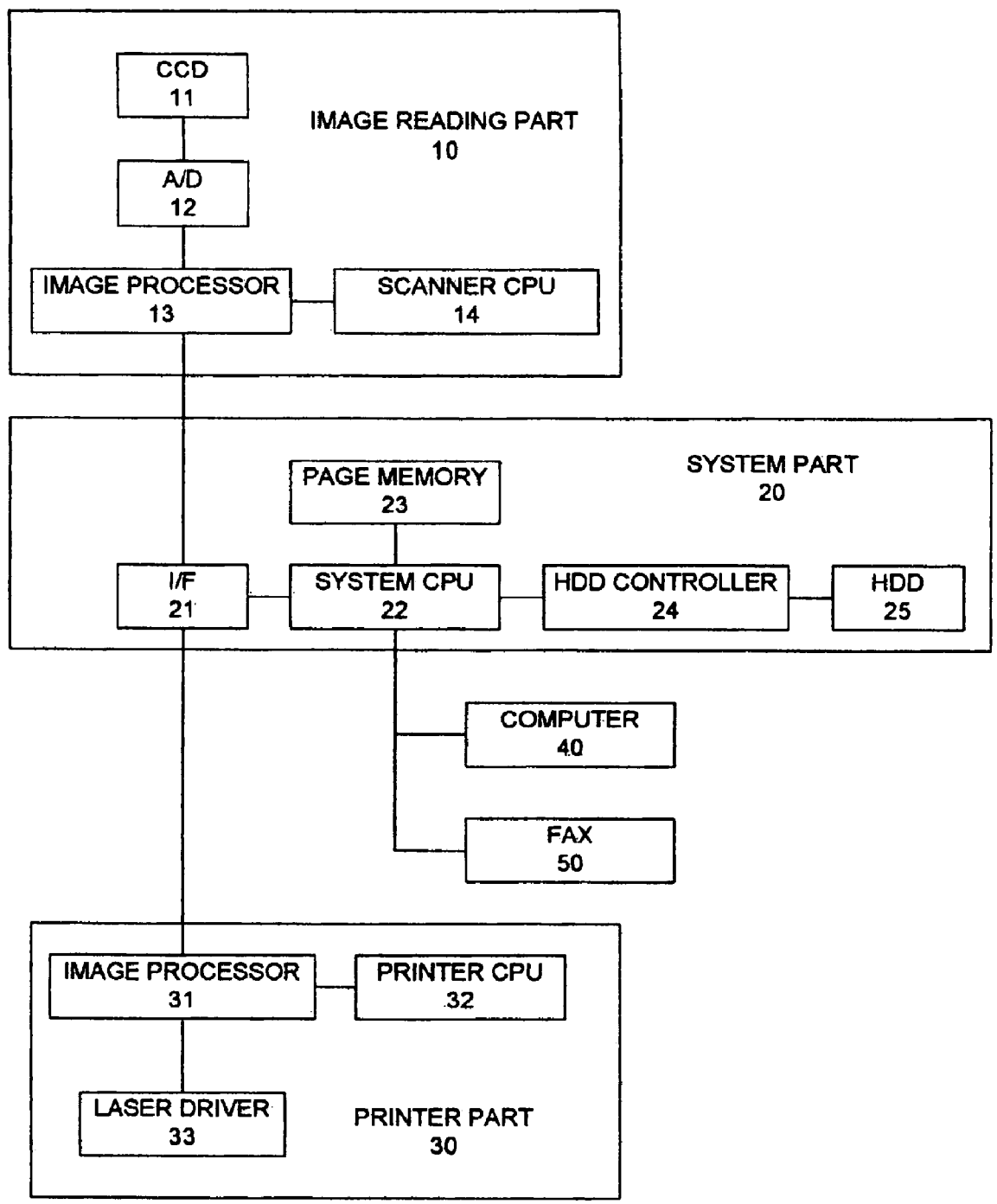
FIG. 1 is a block diagram of a hardcopy device consistent with the present invention.

FIG. 1 is a block diagram of a hardcopy device consistent with the present invention. As shown in FIG. 1, the hardcopy device includes an image reading part 10, a system part 20, and a printer part 30. In addition to these parts of the hardcopy device, FIG. 1 shows a computer 40 and a fax 50. The image reading part 10 includes a CCD 11, an analog to digital (A/D) converter 12, an image processor 13, and a scanner CPU 14. The system part 20 includes an interface (I/F) 21, a system CPU 22, a page memory 23, an HDD controller 24, and an HDD 25. The printer part includes an image processor 31, a printer CPU 32, and a laser driver 33. The hardcopy device may be, for example, a printer, a copier, or an MFP.

With respect to the image reading part 10, an original, such as a document or photograph, is set on an original table, typically formed of glass, and irradiated with a light source. Through a mirror or a condenser lens, the reflected light from the original is detected by the CCD 11, which converts the detected light into an analog electrical signal according to the intensity of the detected light. The analog electrical signal is converted into a digital signal by the A/D 12. The digital signal output by the A/D 12 is received by the image processor 13, which performs one or more image processing functions or algorithms on the image data, such as filtering, smoothing, dithering, halftone processing, error diffusion, gamma correction, or shading compensation, which compensates for distortion of low frequency caused by the condenser lens and distortion of high-frequency generated by the sensitivity variation of the CCD 11. The CCD 11, the A/D 12, the image processor 13, and the other elements of the image reading part 10 operate under the control of the scanner CPU 14.

The image data from the image processor 13 is output to the interface 21 of the system part 20. Depending upon the function being performed by the hardcopy device, such as a copy function or a print function, the image data received by the interface 21 may be stored in the page memory 23 and/or the HDD 25, which is written to and read from under the control of the HDD controller 24. The interface 21 also provides image data to the image processor 31 of the printer part 30. The image data provided to the image processor 31 by the interface 21 corresponds to image data to be printed and may be image data from the page memory 23, the HDD 25, the computer 40 (e.g., in response to a print request), the fax 50 (e.g., in response to receiving a fax), or directly from the image processor 13. The system CPU 22 controls the storage of image data received by the interface 21 from the image processor 13 and the output of image data by the interface 21 to the image processor 31.

The image processor 31 converts the image data received from the interface 21 into a format appropriate for printing, i.e., a raster image. The laser driver 33 receives the raster image data from the image processor 31 and controls a laser to expose a photoelectric drum, thereby forming a latent image on the drum that gets converted to a toner image. The toner image is fused onto a paper sheet or other image receivable medium to reproduce the original. The image processor 31 and the laser driver 33 are controlled by the printer CPU 32. Although the printer part 30 is shown as including a laser driver 33, it should be understood that other printing technologies can be used that do not use laser drivers, such as ink or bubble jets.

Figure 2:
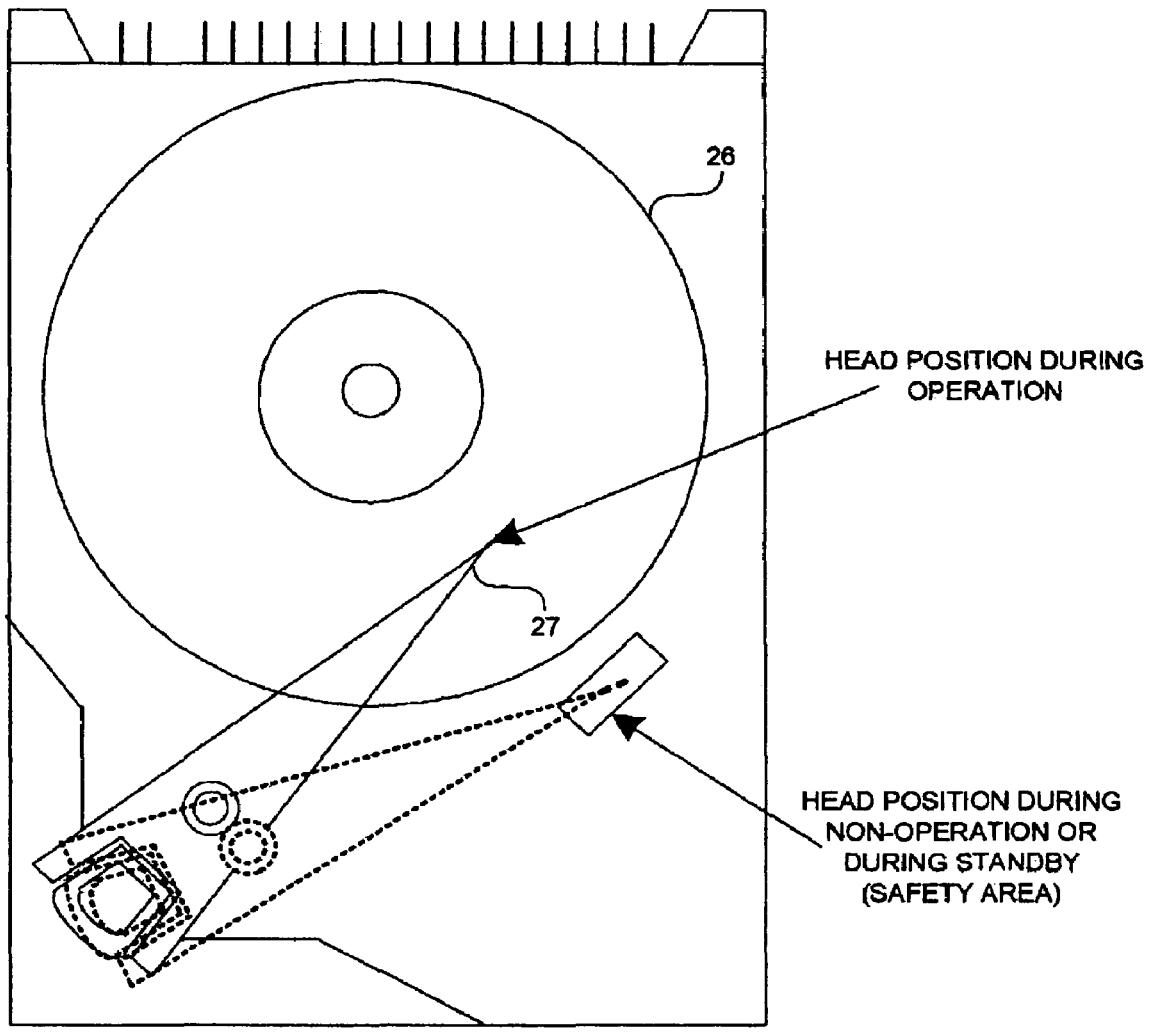
FIG. 2 is a diagram of a hard disk drive for a hardcopy device consistent with the present invention.

FIG. 2 is a diagram of a hard disk drive for a hardcopy device consistent with the present invention. As shown in FIG. 2, the HDD 25 includes a magnetic disk 26 and a head 27. The head 27 can be positioned either in an operating position above the magnetic disk 26, or in a safe position away from the magnetic disk 26. The safe position may be, for example, any position where the head 27 is not over the magnetic disk 26. The head 27 can be positioned to not be over the magnetic disk 26 by moving the head 27 outside of the outer periphery of the magnetic disk 26, such as shown in FIG. 2. Alternatively, the head 27 can be moved inside the inner periphery of the magnetic disk 26, i.e., inside the hole in the center of the magnetic disk 26. More preferably, the safe position is any position where the head 27 is positioned sufficiently away from the magnetic disk 26 such that the head 27 will not hit or damage the magnetic disk in response to a vibration or shock to the hardcopy device.

Figure 3:
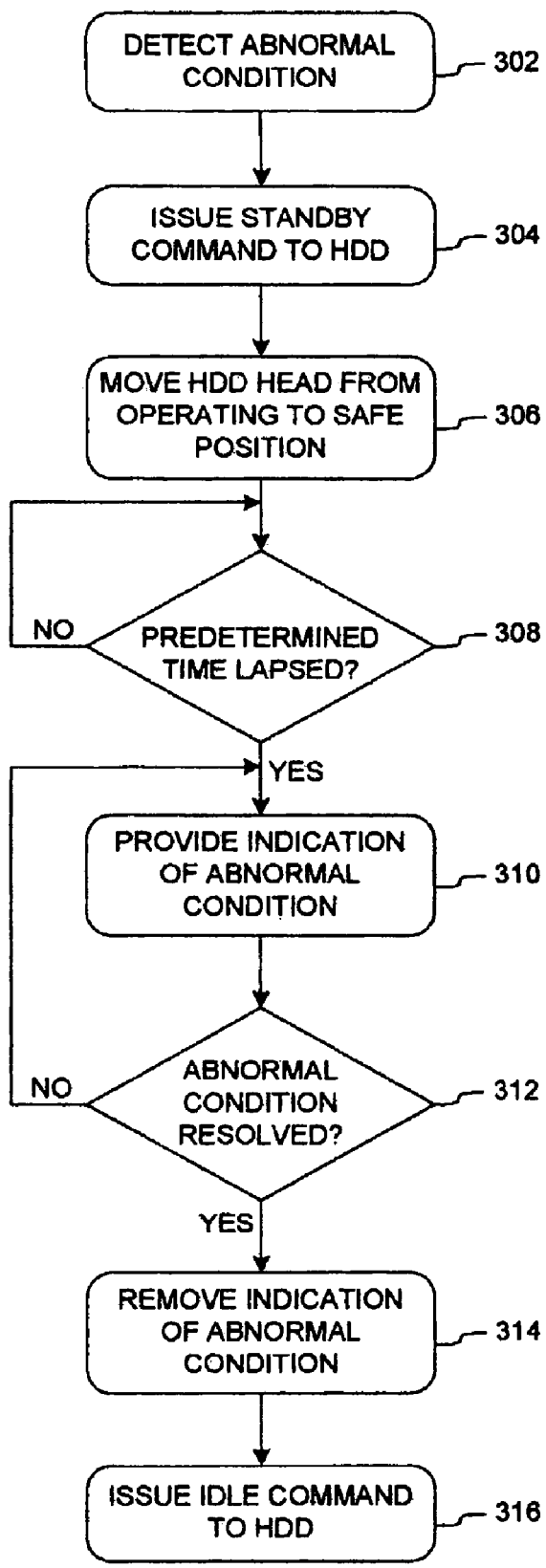
FIG. 3 is a flow chart of a hard disk drive protection process consistent with the present invention.

FIG. 3 is a flow chart of a hard disk drive protection process consistent with the present invention. As shown in FIG. 3, during the operation of the hardcopy device, an abnormal condition is detected (step 302). In general, an abnormal condition can correspond to any time that the hardcopy device becomes incapable of continuing to operate or become incapable of continuing to process a print job. The abnormal condition can arise due to, for example, a paper jam, a serviceman call, an empty toner, a full toner bag, or a paper empty condition. The serviceman call may be an automated response by the hardcopy device after a predetermined period of time of operation, such as six months, or in response to some malfunction of the hardcopy device that cannot be resolved without intervention by a serviceman. The empty toner condition occurs when there is no more toner available for generating reproductions of original. The full toner bag indicates that the bag or container collecting residual or waste toner is full. The hardcopy device is preferably implemented with sensors to detect the abnormal conditions of the hardcopy device. The outputs of these sensors are preferably provided to the system CPU 22, which can determine if an abnormal condition exists.

If an abnormal condition is detected, a standby command is issued to the HDD 25 (step 304). In particular, the system CPU 22, having detected the abnormal condition, issues the standby command to the HDD 25. In response to the standby command, the HDD controller 24 moves the head 27 of the HDD 25 from an operating position to a safe position (step 306). As described above, the safe position is a position where the head 27 is away from the magnetic disk 26, and preferably sufficiently away from the magnetic disk 26 such that the head 27 would not hit or damage the magnetic disk 26 in response to a typical vibration or shock to the hardcopy device. Once the head 27 reaches the safe position, the HDD controller 24 can generate a signal received by the system CPU 22 indicating that the head 27 has reached the safe position.

In addition to moving the head 27 of the HDD 25, the system checks whether a predetermined amount of time has elapsed since the detection of the abnormal condition (step 308). When the abnormal condition is detected, the system CPU 22 preferably starts a timer. In addition, the system CPU 22 checks to determine if the timer has reached the predetermined amount of time, such as 1.5 seconds. The predetermined amount of time is preferably at least as much as the time it takes the head 27 to move from the operating position to the safe position.

If the predetermined amount of time has elapsed, then an indication of the abnormal condition is generated (step 310). The indication identifies the existence of the abnormal condition and what has caused the occurrence of the abnormal condition. The indication can be provided visually, such as by showing the cause of the abnormal condition on a display of the hardcopy device. Alternatively, it can be an audible indication provided by a voice message identifying the cause of the abnormal condition. It is also possible for the indication to be made by sending an e-mail, such as to a network administrator or the current or most recent user, indicating the existence and cause of the abnormal condition.

In accordance with steps 306–310, after an abnormal condition is detected, the head 27 of the HDD 25 is moved to a safe position. Then, following a lapse of a predetermined amount of time, the indication of the existence and cause of the abnormal condition is provided. This may be a serviceman call, paper jam, toner empty condition, toner waste full, or empty paper in the paper supply. The delay in providing the indication of the existence and cause of the abnormal condition ensures that any attempt to resolve the abnormal condition, which may cause vibrations or shock to the hardcopy device, and correspondingly to the HDD 25, will not occur until after the head 27 is moved to the safe position. Although the delayed indication occurs by waiting for a predetermined amount of time to elapse, other approaches avoid using such a predetermined time delay. Rather, a signal can be generated indicating that the head 27 has moved to the safe position, as described above, and the indication of the abnormal condition is only provided after such a signal is generated.

Once the existence and cause of the abnormal condition has been indicated, the user or serviceman attempts to resolve or eliminated the abnormal condition. For example, if there is a paper jam, any jammed papers are removed from the hardcopy device, and all of the components of the hardcopy device are returned to their operating positions (not including the head 27 of the HDD 25). If there is a toner empty condition, the empty toner bottle is replaced or toner is added to the toner supply. If there is a full toner bag, then the toner bag is emptied and put back in the hardcopy device. If there is no paper, then paper is added to the drawer, cassette, cartridge or other paper supply. If a serviceman call is required, this service will take place accordingly.

While the abnormal condition exists, the system CPU 22 checks to determine if the abnormal condition has been resolved (step 312). Should the abnormal condition persist, the hardcopy device continues to provide the indication of the existence and cause of the abnormal condition. On the other hand, if the abnormal condition has been resolved, then the hardcopy device removes the indication of the existence and cause of the abnormal condition (step 314). For example, an appropriate message can indicate that the abnormal condition is removed from the display on the hardcopy device, enabling the user to continue a job that had been interrupted by the abnormal condition or to begin a new job.

In addition, with the abnormal condition resolved, an idle command is issued to the HDD 25 (step 316). The idle command instructs the HDD controller 24 to move the head 27 to a position where it can restart or begin operating. Furthermore, the hardcopy device warms up to enable the completion of any interrupted job or the beginning of a new job. The time associated with moving the head 27 back into operating position, e.g., 5 seconds, passes during the warm-up of the machine.

In accordance with the present invention, it is possible to avoid damage to the HDD of the hardcopy device when an abnormal condition arises. In particular, when an abnormal condition is detected, the head of the HDD is moved to a safe position, and an indication of the existence and cause of the abnormal condition is delayed until the head is in the safe position. The delay in providing the indication can be implemented by waiting for a predetermined time to elapse from the time the abnormal condition is detected. Alternatively, a signal can be generated when the head reaches the safe position, and the indication of the abnormal condition is provided after the signal is generated.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method for protecting a hard disk drive in a hardcopy device, comprising:
    detecting an abnormal condition during operation of the hardcopy device;
    moving a head of the hard disk drive to a safe position in response to the detection of the abnormal condition; and
    generating an indication of the abnormal condition after the head of the hard disk drive has been moved to the safe position.

2. A method according to claim 1, wherein the abnormal condition is a paper jam.

3. A method according to claim 1, wherein the abnormal condition is a serviceman call.

4. A method according to claim 1, wherein the abnormal condition is a toner empty condition.

5. A method according to claim 1, wherein the abnormal condition is a toner waste full condition.

6. A method according to claim 1, wherein the abnormal condition is a paper empty condition.

7. A method according to claim 1, further comprising:
    detecting whether the abnormal condition has been resolved; and
    moving the head of the hard disk drive to an operational position if the resolution of the abnormal condition has been detected.

8. A method according to claim 1, wherein the generated indication of the abnormal condition is a display shown on a visual display of the hardcopy device identifying the abnormal condition.

9. A method according to claim 1, wherein the generated indication of the abnormal condition is an audible indication identifying the abnormal condition.

10. A method according to claim 1, further comprising issuing a standby command to the hard disk drive to move the head to the safe position in response to detecting the abnormal condition.

11. A method according to claim 1, wherein the safe position of the head is a position in which the head is positioned outside an outer periphery of a magnetic disk of the hard disk drive.

12. A method according to claim 1, wherein the safe position of the head is a position in which the head is positioned away from a magnetic disk of the hard disk drive such that the head cannot contact the magnetic disk in response to a vibration or shock to the hardcopy device.

13. A method according to claim 1, further comprising generating a signal when the head of the hard disk drive has reached the safe position,
    wherein the indication is generated in response to the signal.

14. A method for protecting a hard disk drive in a hardcopy device, comprising:
    detecting an abnormal condition during operation of the hardcopy device;
    moving a head of the hard disk drive to a safe position in response to the detection of the abnormal condition;
    determining whether a predetermined time has lapsed after detecting the abnormal condition; and
    generating an indication of the abnormal condition after the predetermined time has lapsed.

15. A method according to claim 14, wherein a time to move the head to the safe position is less than the predetermined time.

16. A method according to claim 14, further comprising:
    detecting whether the abnormal condition has been resolved; and
    moving the head of the hard disk drive to an operational position if the resolution of the abnormal condition has been detected.

17. A method according to claim 14, wherein the safe position of the head is a position in which the head is positioned outside an outer periphery of a magnetic disk of the hard disk drive.

18. A method according to claim 14, further comprising:
    detecting an insertion of a paper cassette in the hardcopy device;
    detecting if paper is present in the paper cassette inserted in the hardcopy device; and
    moving the head of the hard disk drive to the safe position if no paper is detected as being present in the paper cassette.

* * * * *